(12) United States Patent
Suzuki et al.

(10) Patent No.: US 11,774,018 B2
(45) Date of Patent: Oct. 3, 2023

(54) ROTARY JOINT

(71) Applicant: NIPPON PILLAR PACKING CO., LTD., Osaka (JP)

(72) Inventors: Osamu Suzuki, Osaka (JP); Yasuyuki Okunishi, Osaka (JP); Shuhei Matsui, Osaka (JP); Masanao Ishijima, Osaka (JP)

(73) Assignee: NIPPON PILLAR PACKING CO., LTD., Osaka (JP)

( * ) Notice: Subject to any disclaimer, the term of this patent is extended or adjusted under 35 U.S.C. 154(b) by 287 days.

(21) Appl. No.: 17/417,948

(22) PCT Filed: Sep. 25, 2019

(86) PCT No.: PCT/JP2019/037570
§ 371 (c)(1),
(2) Date: Jun. 24, 2021

(87) PCT Pub. No.: WO2020/137049
PCT Pub. Date: Jul. 2, 2020

(65) Prior Publication Data
US 2022/0120366 A1    Apr. 21, 2022

(30) Foreign Application Priority Data

Dec. 26, 2018 (JP) .................. 2018-243016

(51) Int. Cl.
*F16L 27/08*    (2006.01)
*F16L 39/04*    (2006.01)
*F16L 39/06*    (2006.01)

(52) U.S. Cl.
CPC .............. *F16L 27/08* (2013.01); *F16L 39/04* (2013.01); *F16L 39/06* (2013.01)

(58) Field of Classification Search
CPC ......... F16L 39/04; F16L 39/06; F16L 27/087; F16L 27/0828
See application file for complete search history.

(56) References Cited

U.S. PATENT DOCUMENTS

| | | | |
|---|---|---|---|
| 6,073,970 A * | 6/2000 | Ott ................ | F16L 39/04 285/190 |
| 6,085,782 A * | 7/2000 | Ott ................ | F16L 39/04 901/29 |

(Continued)

FOREIGN PATENT DOCUMENTS

| | | | |
|---|---|---|---|
| JP | 58-49086 U | | 4/1983 |
| JP | 2001141150 A | * | 5/2001 |

(Continued)

OTHER PUBLICATIONS

International Search Report dated Nov. 26, 2019 issued in corresponding PCT/JP2019/037570 application (1 page).

*Primary Examiner* — Matthew Troutman
*Assistant Examiner* — Fannie C Kee
(74) *Attorney, Agent, or Firm* — MILLEN, WHITE, ZELANO & BRANIGAN, P.C.; William Nixon

(57) ABSTRACT

Each of the mechanical seal devices of a rotary joint includes a first shaft side seal ring attached to a shaft body and a first case slide seal ring attached to one side of the first shaft side seal ring as well as a second case side seal ring attached to a case body and a second shaft side seal ring attached to the second case side seal ring. A first communication flow passage is formed between a first sliding portion of the first seal rings and a second sliding portion of the second seal rings. A second communication flow passage is formed between the first sliding portion of a mechanical seal device disposed on one side in the axial direction and the second (Continued)

sliding portion of a mechanical seal device disposed on the other side in the axial direction in mechanical seal devices adjacent to each other.

4 Claims, 6 Drawing Sheets

(56) References Cited

U.S. PATENT DOCUMENTS

| | | | |
|---|---|---|---|
| 2001/0052676 A1* | 12/2001 | Omiya | F16L 27/087 |
| | | | 277/614 |
| 2008/0061514 A1* | 3/2008 | Suzuki | F16L 39/04 |
| | | | 277/375 |
| 2016/0258564 A1* | 9/2016 | Fukumoto | F16L 39/06 |
| 2017/0051857 A1* | 2/2017 | Sakakura | F16L 39/04 |
| 2018/0036753 A1* | 2/2018 | Pungetti | F16L 39/06 |
| 2018/0058593 A1* | 3/2018 | Suzuki | F16L 39/06 |

FOREIGN PATENT DOCUMENTS

| | | | |
|---|---|---|---|
| JP | 2002174379 A | * | 6/2002 |
| JP | 2004316775 A | * | 11/2004 |
| JP | 2007-278424 A | | 10/2007 |
| JP | 2009-168068 A | | 7/2009 |
| JP | 2012-92955 A | | 5/2012 |
| WO | WO-2019171697 A1 | * | 9/2019 |

* cited by examiner

ROTARY JOINT

TECHNICAL FIELD

The present invention relates to a rotary joint.

BACKGROUND ART

A rotary joint is used to connect a flow passage of a fixed side member and a flow passage of a rotating side member to each other. For example, in a chemical mechanical polishing device (CMP device) used to perform surface polishing treatment of a semiconductor wafer, polishing liquid, pressurizing air, washing water, pure water, air blowing air, polishing residual liquid, etc. flows as a sealed fluid between a rotating side member (a turntable or a top ring) and a fixed side member (a main body of the CMP device) supporting the rotating side member. A plurality of independent fluid passages is used for a joint portion that connects between the rotating side member and the fixed side member to allow the sealed fluid to flow between the rotating side member and the fixed side member without mixing. Therefore, for example, a multi-port type rotary joint disclosed in Patent Literature 1 is used as the joint portion.

The rotary joint of Patent Literature 1 includes a tubular case body, a rotating shaft body rotatably provided in the case body, and a plurality of mechanical seals provided side by side in an axial direction in an annular space between the case body and the rotating shaft body. A plurality of case side passages penetrating in a radial direction is formed in the case body. In the rotating shaft body, the same number of shaft side passages as the number of case side passages are formed to open on an outer circumferential side of the rotating shaft body.

Each of the mechanical seals includes a static seal ring attached to the case body and a rotary seal ring that rotates integrally with the rotating shaft body, and the rotary seal ring slides with respect to the static seal ring. In a pair of mechanical seals in which static seal rings are adjacent to each other in the axial direction, a communication passage connecting one case side passage and one shaft side passage is formed between a sliding portion of one mechanical seal and a sliding portion of the other mechanical seal.

CITATION LIST

Patent Literature

Patent Literature 1: JP 2007-278424 A

SUMMARY OF INVENTION

Technical Problem

In the rotary joint, in order to form one communication passage, it is necessary to provide two mechanical seals side by side in the axial direction. For this reason, when the number of the communication passages (the number of ports) increases, a total length of the rotary joint in the axial direction becomes long, and there is a problem that the rotary joint may not be mounted depending on the device.

The invention has been made in view of such circumstances, and an object of the invention is to provide a rotary joint capable of suppressing an increase in the total length in the axial direction even when the number of ports increases.

Solution to Problem (1) A rotary joint of the invention includes a tubular case body in which a plurality of outer flow passages is formed by opening on an inner circumferential side, a sealed fluid flowing through the outer flow passages, a shaft body relatively rotatably provided in the case body, a plurality of inner flow passages through which a sealed fluid flows being formed therein by opening on an outer circumferential side, and a plurality of mechanical seal devices disposed side by side in an axial direction in an annular space formed between the case body and the shaft body, in which each of the mechanical seal devices includes a first shaft side seal ring attached to the shaft body, a first case side seal ring attached adjacent to one side of the first shaft side seal ring in the axial direction in the case body to slide relative to the first shaft side seal ring, a second case side seal ring attached to one side in the axial direction with respect to the first case side seal ring in the case body, and a second shaft side seal ring attached adjacent to one side of the second case side seal ring in the axial direction in the shaft body to slide relative to the second case side seal ring, a first communication flow passage that partitions the annular space and connects one of the outer flow passages and one of the inner flow passages is formed between a first sliding portion of the first shaft side seal ring and the first case side seal ring and a second sliding portion of the second shaft side seal ring and the second case side seal ring in each of the mechanical seal devices, and a second communication flow passage that partitions the annular space and connects another one of the outer flow passages and another one of the inner flow passages is formed between the first sliding portion of a mechanical seal device disposed on one side in the axial direction and the second sliding portion of a mechanical seal device disposed on the other side in the axial direction in mechanical seal devices adjacent to each other in the axial direction.

In the rotary joint configured as described above, the first communication flow passage connecting one outer flow passage and one inner flow passage is formed between the first sliding portion and the second sliding portion of each of the mechanical seal devices. In addition, the second communication flow passage connecting another outer flow passage and another inner flow passage is formed between the first sliding portion of the mechanical seal device disposed on one side in the axial direction and the second sliding portion of the mechanical seal device disposed on the other side in the axial direction in the mechanical seal devices adjacent to each other in the axial direction. In this way, three communication flow passages can be formed by two mechanical seal devices (corresponding to four conventional mechanical seals). On the other hand, in the conventional rotary joint, six mechanical seals are required to form three communication flow passages. Therefore, according to the rotary joint of the invention, it is possible to suppress the increase in the total length in the axial direction even when the number of communication flow passages (the number of ports) increases when compared to the conventional rotary joint.

(2) It is preferable that one of the plurality of mechanical seal devices disposed at one end in the axial direction further includes a third shaft side seal ring attached to the shaft body on a side of the one end of one of the first sliding portion and the second sliding portion disposed on the one end side, and a third case side seal ring attached to the case body adjacent to the one end side of the third shaft side seal ring to slide relative to the third shaft side seal ring, and a third communication flow passage that partitions the annular space and connects still another one of the outer flow passages and still another one of the inner flow passages is formed between the one sliding portion and a third sliding portion of the third shaft side seal ring and the third case side seal ring.

In this case, for example, when one communication flow passage is increased at one end of the rotary joint 1 in the axial direction, one communication flow passage can be increased only by adding two seal rings (the third shaft side seal ring and the third case side seal ring) to the mechanical seal device disposed at the one end side. In this way, it is possible to suppress the increase in the total length in the axial direction when compared to the case of adding the mechanical seal device that forms one communication flow passage using four seal rings (the first and second shaft side seal rings and the first and second case side seal rings).

(3) It is preferable that the case body has an axial cooling flow passage, through which a cooling fluid flows, formed to extend in the axial direction independently of the annular space.

In this case, by allowing the cooling fluid to flow through the axial cooling flow passage formed to extend in the axial direction independently of the annular space in the case body, it is possible to cool the sliding portion of the case side seal ring and the shaft side seal ring via the case body and each of the case side seal rings. In this way, it is possible to suppress sliding heat generation at each of the sliding portions. In particular, when the second communication flow passage is formed in the annular space A as in the item (1), the second communication flow passage may not be used as a cooling space. However, even in such a case, it is possible to effectively suppress sliding heat generation at the first and second sliding portions forming the second communication flow passage.

(4) It is preferable that the case body has a plurality of axial cooling flow passages formed in a circumferential direction thereof, and a circumferential cooling flow passage that is formed to extend in the circumferential direction independently of the annular space and communicates with the plurality of axial cooling flow passages.

In this case, the cooling fluid passes through the circumferential cooling flow passage and flows to the plurality of axial cooling flow passages, and thus can cool the respective sliding portions at a plurality of locations in the circumferential direction. In this way, it is possible to further suppress sliding heat generation at the respective sliding portions.

(5) It is preferable that the plurality of axial cooling flow passages includes a first axial cooling flow passage to which the cooling fluid is supplied from an outside of the case body, and two or more second axial cooling flow passages to which the cooling fluid is supplied from the first axial cooling flow passage via the circumferential cooling flow passage, a cross-sectional area of the first axial cooling flow passage is formed to be smallest among the plurality of axial cooling flow passages, and respective cross-sectional areas of the two or more second axial cooling flow passages are formed to gradually increase as a distance from the first axial cooling flow passage increases.

In this case, the cross-sectional area of the first axial cooling flow passage, through which the cooling fluid flows most easily, is formed to be the smallest among the plurality of axial cooling flow passages, and the cross-sectional area gradually increases in the second axial cooling flow passages away from the first axial cooling flow passage, that is, in the second axial cooling flow passages through which the cooling fluid hardly flows. In this way, the cooling fluid can be allowed to evenly flow through the plurality of axial cooling flow passages, and thus it is possible to further suppress sliding heat generation at the respective sliding portions.

Advantageous Effects of Invention

According to the rotary joint of the invention, it is possible to suppress an increase in the total length in the axial direction even when the number of ports increases.

DESCRIPTION OF EMBODIMENTS

Next, preferred embodiments of the invention will be described with reference to the accompanying drawings.

First Embodiment

<Overall Configuration>

Figure 1:
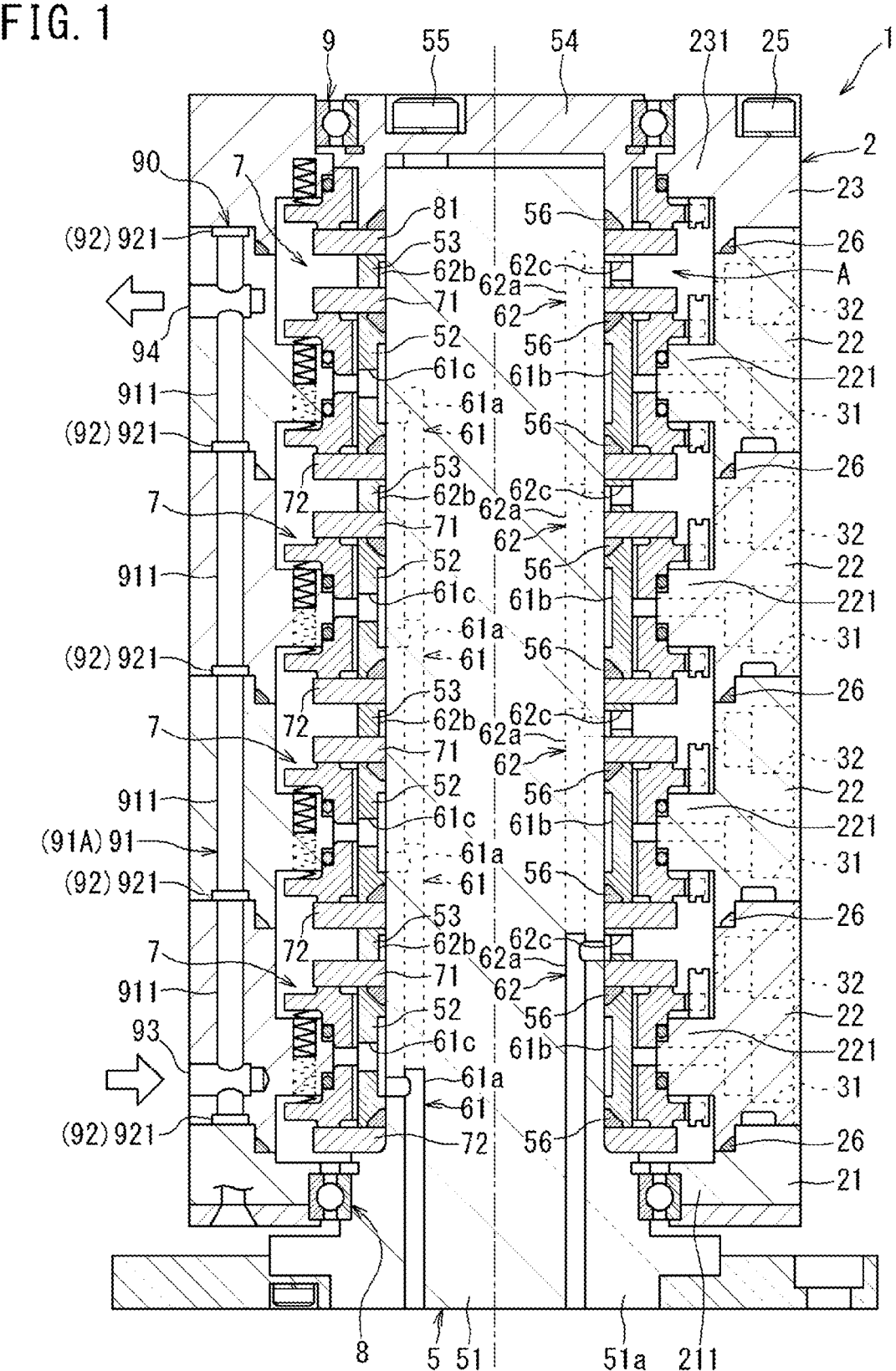
FIG. 1 is a cross-sectional view illustrating a rotary joint according to a first embodiment of the invention.

FIG. 1 is a cross-sectional view illustrating a rotary joint according to a first embodiment of the invention. A rotary joint 1 (hereinafter also referred to as a joint 1) includes a tubular case body 2 attached to a fixed side member (for example, a main body of a CMP device) of a rotating machine, and a shaft body 5 attached to a rotating side member (for example, a turntable of the CMP device) of the rotating machine. The case body 2 and the shaft body 5 of the present embodiment are disposed with an axial direction as a vertical direction.

Note that in the invention, the "axial direction" is a direction along a center line of the joint 1 (including a direction parallel to the center line). Respective center lines of the case body 2, the shaft body 5, and a mechanical seal device 7 described below are configured to coincide with the center line of the joint 1. In addition, in the invention, a "radial direction" refers to a direction orthogonal to the center line of the joint 1. In addition, a posture of the joint 1 may correspond to a posture other than a posture illustrated in FIG. 1. For convenience of description, in the present embodiment, an upper side illustrated in FIG. 1 is set to "top" of the joint 1, and a lower side is set to "bottom" of the joint 1.

<Case Body>

The case body 2 is configured by stacking a lower flange 21, a plurality of (four in the illustrated example) flow passage flanges 22, and an upper flange 23 in this order from the bottom. Each of the flanges 21 to 23 is formed in an annular shape, and all the flanges 21 to 23 are connected and fixed by a plurality of bolts 25 (only one is illustrated in the illustrated example). In this way, the case body 2 becomes a tubular structure as a whole.

O-rings 26 are provided between the lower flange 21 and a flow passage flange 22 adjacent to each other, between flow passage flanges 22 adjacent to each other, and between a flow passage flange 22 and the upper flange 23 adjacent to each other, respectively.

The respective flanges 21, 22, and 23 have annular protrusions 211, 221, and 231 protruding inward in the radial direction, respectively. A first outer flow passage 31 through which a sealed fluid flows is formed in a protrusion 221 of each of the plurality of flow passage flanges 22 to penetrate the protrusion 221 in the radial direction. In addition, a second outer flow passage 32 through which a sealed fluid flows is formed in a portion of each of the plurality of flow passage flanges 22 excluding the protrusion 221 to penetrate the portion in the radial direction. Examples of the sealed fluid include fluids such as a polishing liquid, pressurizing air, an inert gas such as nitrogen, washing water, pure water, air blowing air, and a polishing residual liquid.

The respective outer flow passages 31 and 32 are open on the inner circumferential side and the outer circumferential side of the flow passage flange 22. An opening of the flow passage flange 22 on the outer circumferential side serves as a connection port to which each of a plurality of pipes of the fixed side member is connected.

As described above, a plurality of first outer flow passages 31 and a plurality of second outer flow passages 32 through which the sealed fluid flows are alternately formed at predetermined intervals along the axial direction in the case body 2.

<Shaft Body>

The shaft body 5 is disposed on the inner circumferential side of the case body 2, and includes a linear shaft main body 51 which is long in the vertical direction, and a plurality of first sleeves 52 and a plurality of second sleeves 53 fit to the shaft main body 51. The second sleeves 53 are formed shorter in the axial direction than the first sleeves 52. The shaft main body 51 of the present embodiment is provided with four first sleeves 52 and four second sleeves 53.

In addition to the first sleeves 52 and the second sleeves 53, a first shaft side seal ring 71 and a second shaft side seal ring 72 described later are fit to the shaft main body 51. Note that in the present embodiment, the first shaft side seal ring 71 and the second shaft side seal ring 72 are also simply referred to as shaft side seal rings 71 and 72. The shaft side seal rings 71 and 72 are disposed between first sleeves 52 disposed on above the other, and a second sleeve 53 is disposed between these shaft side seal rings 71 and 72. A third shaft side seal ring 81 described later is disposed via a second sleeve 53 on an upper side of a shaft side seal ring 71 disposed at an uppermost portion. Note that in the present embodiment, the third shaft side seal ring 81 is also simply referred to as a shaft side seal ring 81. The shaft side seal ring 81 is fit to the shaft main body 51.

A pressing member 54 is fixed above the shaft main body 51 by a bolt 55. Further, a large diameter portion 51a having a diameter larger than that of other portions is formed at a lower end portion of the shaft main body 51. The large diameter portion 51a regulates downward movement of the first and second sleeves 52 and 53 and the shaft side seal rings 71, 72, and 81 fit to the shaft main body 51.

O-rings 56 are provided between the shaft main body 51, the first sleeves 52, and the shaft side seal rings 71 (72), and between the shaft main body 51, the lower end portion of the pressing member 54, and the shaft side seal rings 81, respectively. The O-rings 56 prevent the sealed fluid flowing through a first inner flow passage 61 and a second inner flow passage 62, which will be described later, from entering another flow passage or leaking to the outside.

A rolling bearing 8 is provided between the large diameter portion 51a of the shaft main body 51 and the lower flange 21, and a rolling bearing 9 is provided between the pressing member 54 and the upper flange 23. As a result, the shaft body 5 including the shaft main body 51 and the sleeves 52 and 53 is rotatably supported with respect to the case body 2 together with the shaft side seal rings 71, 72, and 81.

A plurality of (four in the illustrated example) flow passage holes 61a and a plurality of (four in the illustrated example) flow passage holes 62a are formed in the shaft main body 51. One end side of each of the plurality of flow passage holes 61a and 62a is open at a different position in the axial direction (vertical direction) on an outer circumferential surface of the shaft main body 51. The other end side of each of the plurality of flow passage holes 61a and 62a is open on an end surface (lower end surface) of the shaft main body 51, and a plurality of pipes of the rotating side member is connected to openings on the end surface, respectively.

A first sleeve 52 corresponding to the opening on the one end side of each of the flow passage holes 61a has an annular gap 61b formed between the first sleeve 52 and the outer circumferential surface of the shaft main body 51 on the inner circumferential side, and a plurality of (only one is illustrated in the figure) through-holes 61c formed at predetermined intervals in a circumferential direction. The gap 61b of each of the first sleeves 52 communicates with the corresponding flow passage hole 61a on the inner circumferential side, and communicates with the plurality of through-holes 61c on the outer circumferential side.

Similarly, a second sleeve 53 corresponding to the opening on the one end side of each of the flow passage holes 62a has an annular gap 62b formed between the second sleeve 53 and the outer circumferential surface of the shaft main body 51 on the inside in the radial direction, and a plurality of (only one is illustrated in the figure) through-holes 62c formed at predetermined intervals in the circumferential direction. The gap 62b of each of the second sleeves 53 communicates with the corresponding flow passage hole 62a on the inner circumferential side, and communicates with the plurality of through-holes 62c on the outer circumferential side.

The first inner flow passage 61 through which the sealed fluid flows includes each of the flow passage holes 61a in the shaft main body 51, the gap 61b of the first sleeve 52 corresponding to the flow passage hole 61a, and the plurality of through-holes 61c corresponding to the gap 61b. In this way, the first inner flow passage 61 has the through-holes 61c used as opening holes of the shaft body 5 on the outer circumferential side.

Similarly, the second inner flow passage 62 through which the sealed fluid flows includes each of the flow passage holes 62a in the shaft main body 51, the gap 62b of the second sleeve 53 corresponding to the flow passage hole 62a, and the plurality of through-holes 62c corresponding to the gap 62b. In this way, the second inner flow passage 62 has the through-holes 62c used as opening holes of the shaft body 5 on the outer circumferential side.

As described above, on the outer circumferential side of the shaft body 5, a plurality of (four) first inner flow passages 61 and a plurality (four) second inner flow passages 62 are formed by opening at different positions in the axial direction.

<Mechanical Seal Device>

An annular space A is formed between the case body 2 and the shaft body 5, and a plurality of (four in the illustrated example) mechanical seal devices 7 is disposed side by side in an axial direction in the annular space A. In this way, the joint 1 of the present embodiment is a multi-flow passage rotary joint obtained by disposing the plurality of mechanical seal devices 7 in the axial direction of the annular space A.

Figure 2:
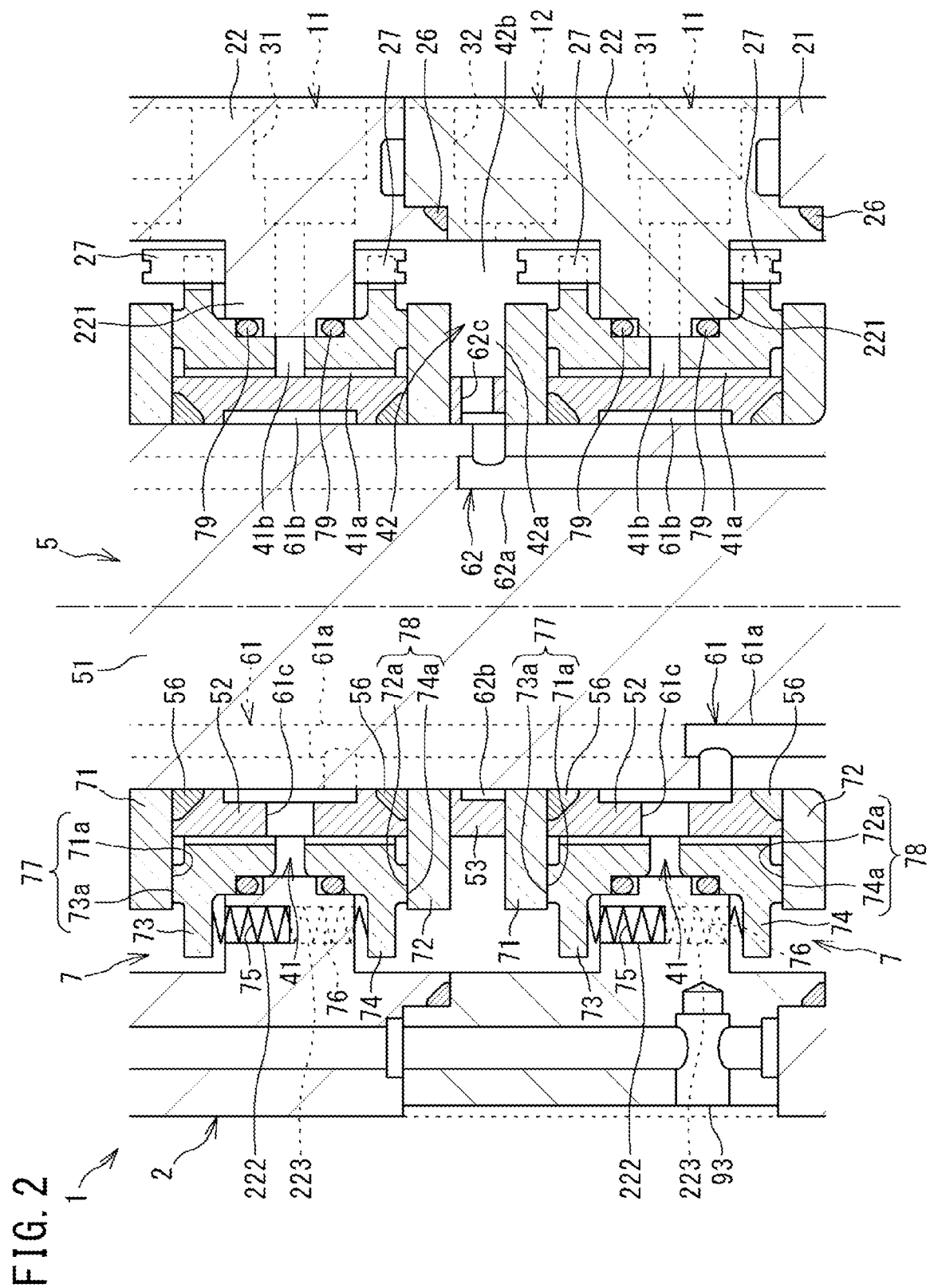
FIG. 2 is an enlarged cross-sectional view illustrating a lower side of the rotary joint.

FIG. 2 is an enlarged cross-sectional view illustrating a lower side of the joint 1. In FIG. 2, each of the mechanical seal devices 7 includes the first shaft side seal ring 71 and the second shaft side seal ring 72 attached to the shaft body 5, a first case side seal ring 73 and a second case side seal ring 74 attached to the case body 2, and a first coil spring 75 and a second coil spring 76 as press members.

Each of the shaft side seal rings 71 and 72 is made of an annular member. As described above, each of the shaft side seal rings 71 and 72 is integrally rotatably provided on the shaft body 5, and functions as a rotary seal ring. End surfaces of the shaft side seal rings 71 and 72 facing each other are in contact with both end surfaces of the second sleeve 53 in the axial direction, respectively. In this way, the second sleeve 53 functions as a spacer between the shaft side seal rings 71 and 72 adjacent to each other on both sides in the axial direction. An annular sealing surface 71a is formed on a lower end surface of the first shaft side seal ring 71. An annular sealing surface 72a is formed on an upper end surface of the second shaft side seal ring 72.

Each of the case side seal rings 73 and 74 is made of an annular member. The first case side seal ring 73 is disposed adjacent to the lower side of the first shaft side seal ring 71. The second case side seal ring 74 is disposed below the first case side seal ring 73 at a predetermined interval. The second shaft side seal ring 72 is disposed adjacent to the lower side of the second case side seal ring 74.

A radial outer end portion of each of the case side seal rings 73 and 74 is in contact with a pin 27 that protrudes in the axial direction (vertical direction) and is fixed at the protrusion 221 of the flow passage flange 22. In this way, each of the case side seal rings 73 and 74 is stopped by the case body 2 and functions as a static seal ring.

An annular sealing surface 73a in contact with the sealing surface 71a of the first shaft side seal ring 71 is formed on an upper end surface of the first case side seal ring 73. An annular sealing surface 74a in contact with the sealing surface 72a of the second shaft side seal ring 72 is formed on a lower end surface of the second case side seal ring 74.

At the protrusion 221 of the corresponding flow passage flange 22, the first coil spring 75 is inserted into a plurality of insertion holes 222 (only one is illustrated in the figure) formed in the circumferential direction in a compressed state. One end portion of the first coil spring 75 is in contact with the first case side seal ring 73. In this way, due to an elastic restoring force of the first coil spring 75, the first case side seal ring 73 is pressed upward toward the first shaft side seal ring 71 side, and a pressing force in the axial direction acts between both the sealing surfaces 71a and 73a. Note that in addition to the first coil spring 75, another press member may be used.

At the protrusion 221 of the corresponding flow passage flange 22, the second coil spring 76 is inserted into a plurality of insertion holes 223 (only one is illustrated in the figure) formed in the circumferential direction in a compressed state. One end portion of the second coil spring 76 is in contact with the second case side seal ring 74. In this way, due to an elastic restoring force of the second coil spring 76, the second case side seal ring 74 is pressed downward toward the second shaft side seal ring 72 side, and a pressing force in the axial direction acts between both the sealing surfaces 72a and 74a. Note that in addition to the second coil spring 76, another press member may be used.

As described above, as the shaft body 5 rotates with respect to the case body 2, the sealing surfaces 71a and 73a of the first shaft side seal ring 71 and the first case side seal ring 73 slide with each other in a state of being pressed in the axial direction. By sliding the sealing surfaces 71a and 73a together, a sealing function for preventing the sealed fluid from leaking from between both the sealing surfaces 71a and 73a is exhibited.

Similarly, as the shaft body 5 rotates with respect to the case body 2, the sealing surfaces 72a and 74a of the second shaft side seal ring 72 and the second case side seal ring 74 slide with each other in a state of being pressed in the axial direction. By sliding the sealing surfaces 72a and 74a together, a sealing function for preventing the sealed fluid from leaking from between both the sealing surfaces 72a and 74a is exhibited.

Therefore, a sealing function of the mechanical seal device 7 is exhibited by a sliding action associated with relative rotation between the sealing surface 71a of the first shaft side seal ring 71 and the sealing surface 73a of the first case side seal ring 73 and a sliding action associated with relative rotation between the sealing surface 72a of the second shaft side seal ring 72 and the sealing surface 74a of the second case side seal ring 74. Hereinafter, a sliding portion between the sealing surfaces 71a and 73a is referred to as a first sliding portion 77, and a sliding portion between the sealing surfaces 72a and 74a is referred to as a second sliding portion 78.

<First Communication Flow Passage>

The case side seal rings 73 and 74 of each mechanical seal device 7 are provided with a gap between the case side seal rings 73 and 74 and the outer circumferential surface of the first sleeve 52. In this way, a cylindrical gap flow passage 41a through which the sealed fluid flows is formed between the case side seal rings 73 and 74 and the first sleeve 52. The gap flow passage 41a communicates with the through-holes 61c (first inner flow passage 61) of the first sleeve 52. The sealing function of the first and second sliding portions 77 and 78 of each mechanical seal device 7 and the sealing function of the O-ring 56 prevent the sealed fluid from leaking to the outside from the gap flow passage 41a.

An annular flow passage 41b through which the sealed fluid flows is formed between the case side seal rings 73 and 74 of each mechanical seal device 7. The annular flow passage 41b connects the gap flow passage 41a on the inner side in the radial direction and the first outer flow passage 31 on the outer side in the radial direction. An O-ring 79 is provided between the outer circumferential surface of each of the case side seal rings 73 and 74 and an inner circumferential surface of the protrusion 221 of the flow passage flange 22. The O-ring 79 prevents the sealed fluid from leaking to the outside from the annular flow passage 41b. Note that each of the case side seal rings 73 and 74 is fit to the protrusion 221 via the O-ring 79 in a state of being movable in the axial direction.

As described above, the gap flow passage 41a and the annular flow passage 41b which are sealed are formed between the first sliding portion 77 and the second sliding portion 78 of each mechanical seal device 7. The flow passages 41a and 41b are included in the first communication flow passage 41 connecting the first outer flow passage 31 and the first inner flow passage 61. Further, the first outer flow passage 31, the first communication flow passage 41, and the first inner flow passage 61 are included in one independent first fluid passage 11 through which the sealed fluid flows.

<Second Communication Flow Passage>

An inner annular flow passage 42a through which the sealed fluid flows is formed on the radial outer side of the second sleeve 53 between the first shaft side seal ring 71 of the mechanical seal device 7 disposed on the lower side and the second shaft side seal ring 72 of the mechanical seal device 7 disposed on the upper side in the mechanical seal devices 7 vertically adjacent to each other in the axial direction. The inner annular flow passage 42a communicates with the through-holes 62c (second inner flow passage 62) of the second sleeve 53.

An outer annular flow passage 42b through which the sealed fluid flows is formed between the protrusion 221 of the flow passage flange 22 corresponding to the mechanical seal device 7 disposed on the lower side and the protrusion 221 of the flow passage flange 22 corresponding to the mechanical seal device 7 disposed on the upper side. The outer annular flow passage 42b connects the inner annular flow passage 42a on the inner side in the radial direction and the second outer flow passage 32 on the outer side in the radial direction.

The inner annular flow passage 42a and the outer annular flow passage 42b are hermetically sealed by a sealing function of the first sliding portion 77 of the mechanical seal device 7 disposed on the lower side, a sealing function of the O-ring 79 disposed on the lower side of the first sliding portion 77, a sealing function of the second sliding portion 78 of the mechanical seal device 7 disposed on the upper side, a sealing function of the O-rings 56 and 79 disposed on the upper side of the second sliding portion 78, and a sealing function of the O-ring 26 disposed on the radial outer side of the outer annular flow passage 42b. In this way, the sealed fluid is prevented from leaking to the outside from the inner annular flow passage 42a and the outer annular flow passage 42b.

As described above, the inner annular flow passage 42a and the outer annular flow passage 42b which are sealed are formed between the first sliding portion 77 of the mechanical seal device 7 disposed on the lower side and the second sliding portion 78 of the mechanical seal device 7 disposed on the upper side in the mechanical seal devices 7 vertically adjacent to each other in the axial direction. The flow passages 42a and 42b are included in a second communication flow passage 42 connecting the second outer flow passage 32 (excluding the second outer flow passage 32 in the uppermost portion) and the second inner flow passage 62 (excluding the second inner flow passage 62 in the uppermost portion). Further, the second outer flow passage 32, the second communication flow passage 42, and the second inner flow passage 62 are included in one independent second fluid passage 12 through which the sealed fluid flows.

<Modification of Second Communication Flow Passage>

Figure 3:
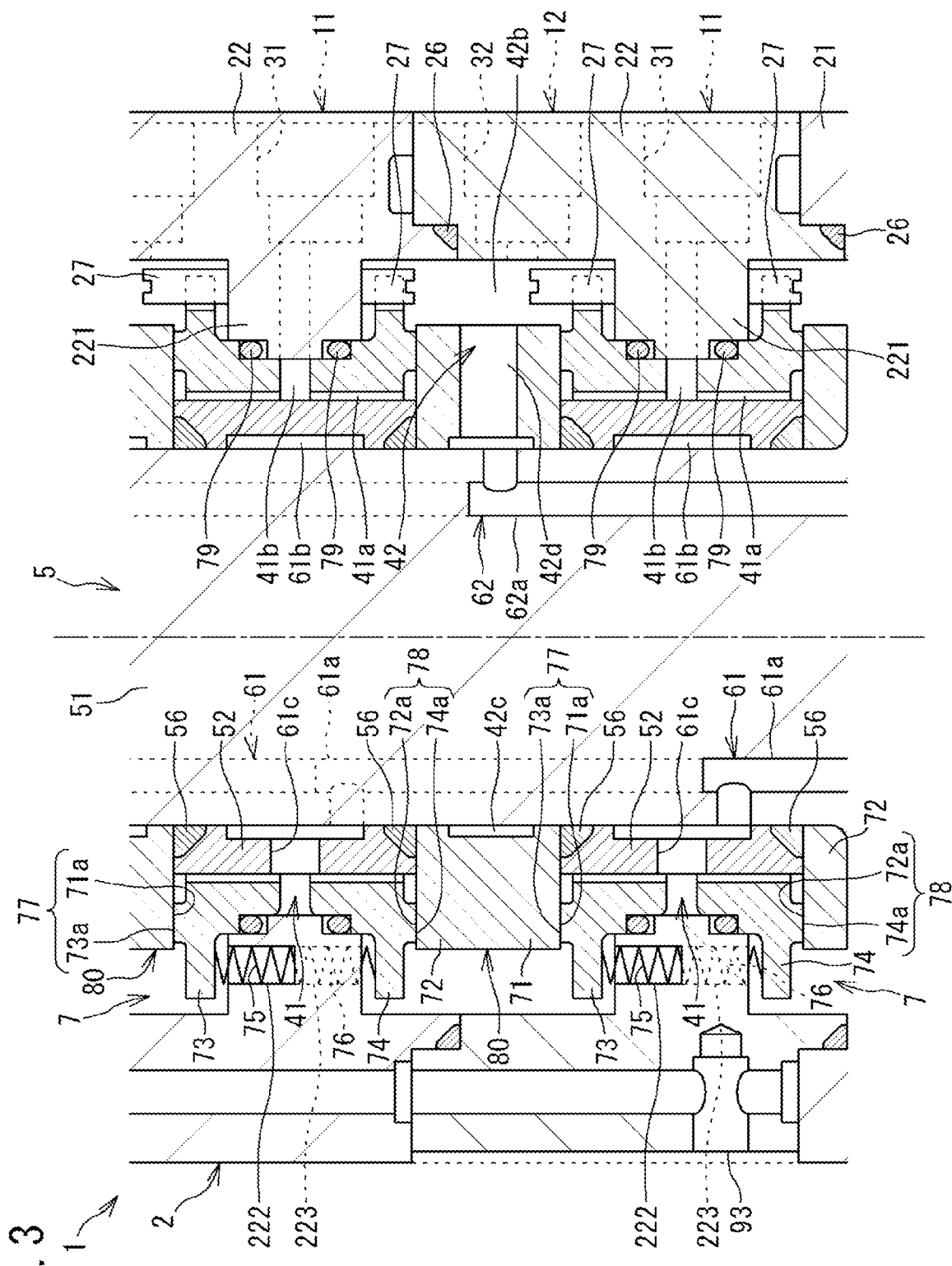
FIG. 3 is an enlarged cross-sectional view illustrating a modification of a second communication flow passage.

FIG. 3 is an enlarged cross-sectional view of the lower side of the joint 1 illustrating a modification of the second communication flow passage 42. In FIG. 3, instead of the second sleeve 53, a shaft side seal ring 80 is integrally rotatably fit to a shaft main body 51 of this modification. The shaft side seal ring 80 integrally forms the first shaft side seal ring 71 of the mechanical seal device 7 disposed on the lower side and the second shaft side seal ring 72 of the mechanical seal device 7 disposed on the upper side in the mechanical seal devices 7 vertically adjacent to each other in the axial direction.

The shaft side seal ring 80 has an annular gap 42c formed between the shaft side seal ring 80 and the outer circumferential surface of the shaft main body 51 on an inner circumferential surface of the shaft side seal ring 80, and a plurality of (only one is illustrated in the figure) through-holes 42d formed at predetermined intervals in the circumferential direction. The gap 42c communicates with the corresponding flow passage hole 62a of the shaft main body 51 on the inner circumferential side and communicates with the plurality of through-holes 42d on the outer circumferential side. Each of the through-holes 42d communicates with the outer annular flow passage 42b.

As described above, in this modification, the second communication flow passage 42 connecting the second outer flow passage 32 (excluding the second outer flow passage 32 in the uppermost portion) and the second inner flow passage 62 (excluding the second inner flow passage 62 in the uppermost portion) has the gap 42c, the through-hole 42d, and the outer annular flow passage 42b. Note that the second inner flow passage 62 of this modification only has the flow passage hole 62a formed in the shaft main body 51.

<Third Sliding Portion>

Figure 4:
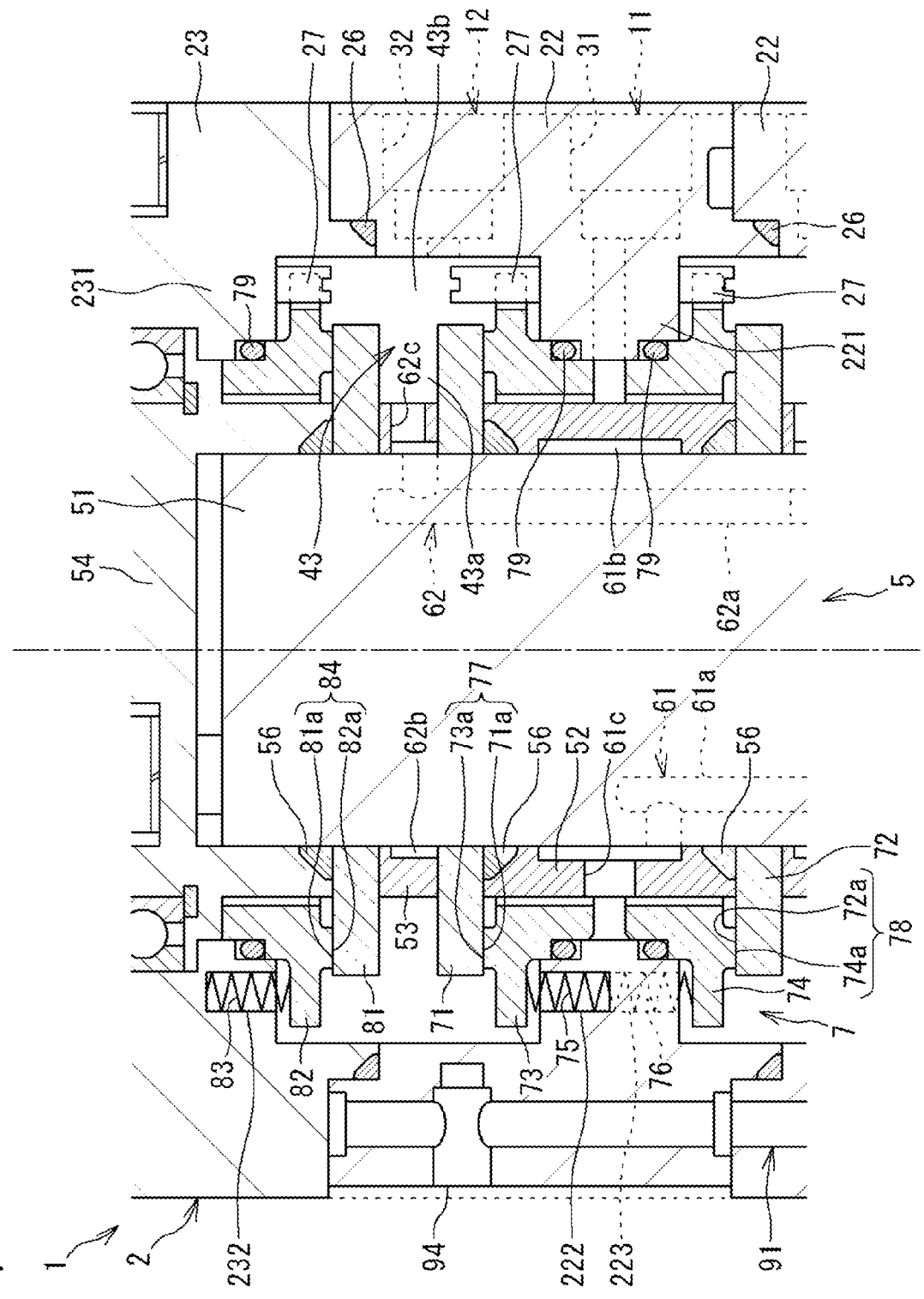
FIG. 4 is an enlarged cross-sectional view illustrating an upper side of the rotary joint.

FIG. 4 is an enlarged cross-sectional view illustrating the upper side of the joint 1. In FIG. 4, a mechanical seal device 7 disposed at the upper end (uppermost portion) in the axial direction further includes the third shaft side seal ring 81 attached to the shaft body 5 above the first sliding portion 77, a third case side seal ring 82 attached to the case body 2 adjacent to the upper side of the third shaft side seal ring 81, and a third coil spring 83 as a press member.

Similarly to the first and second shaft side seal rings 71 and 72, the third shaft side seal ring 81 is made of an annular member. The third shaft side seal ring 81 is provided on the upper side of the first shaft side seal ring 71 so as to be integrally rotatable with the shaft body 5 as described above, and functions as a rotary seal ring. A lower end surface of the third shaft side seal ring 81 is in contact with an upper end surface of the second sleeve 53 disposed on the lower side. In this way, the second sleeve 53 functions as a spacer between the first shaft side seal ring 71 and the third shaft side seal ring 81 adjacent to both sides in the axial direction. An annular sealing surface 81a is formed on an upper end surface of the third shaft side seal ring 81.

Similarly to the first and second case side seal rings 73 and 74, the third case side seal ring 82 is made of an annular member. A radial outer end portion of the third case side seal ring 82 is in contact with the pin 27 that protrudes in the axial direction (vertical direction) and is fixed at the protrusion 231 of the upper flange 23. In this way, the third case side seal ring 82 is stopped by the case body 2 and functions as a static seal ring. An annular sealing surface 82a in contact with the sealing surface 81a of the third shaft side seal ring 81 is formed on the lower end surface of the third case side seal ring 82.

The O-ring 79 is provided between the outer circumferential surface of the third case side seal ring 82 and the inner circumferential surface of the protrusion 231 of the upper flange 23. The O-ring 79 prevents the sealed fluid from leaking to the outside from an outer annular flow passage 43b described later. Note that the third case side seal ring 82 is fit to the protrusion 231 via the O-ring 79 in a state of being movable in the axial direction.

The third coil spring 83 is inserted into a plurality of (only one is illustrated in the figure) insertion holes 232 formed in the circumferential direction in a compressed state at the protrusion 231 of the upper flange 23. One end portion of the third coil spring 83 is in contact with the third case side seal ring 82. In this way, due to the elastic restoring force of the third coil spring 83, the third case side seal ring 82 is pressed downward toward the third shaft side seal ring 81 side, and a pressing force in the axial direction acts between both the sealing surfaces 81a and 82a. Note that in addition to the third coil spring 83, another press member may be used.

As described above, as the shaft body 5 rotates with respect to the case body 2, the sealing surfaces 81a and 82a of the third shaft side seal ring 81 and the third case side seal ring 82 slide with each other in a state of being pressed in the axial direction. By sliding the sealing surfaces 81a and 82a together, a sealing function for preventing the sealed fluid from leaking from between both the sealing surfaces 81a and 82a is exhibited.

Therefore, a sealing function of the mechanical seal device 7 disposed at the uppermost portion is exhibited by a sliding action associated with relative rotation between the sealing surface 81a of the third shaft side seal ring 81 and the sealing surface 82a of the third case side seal ring 82. Hereinafter, a sliding portion between the sealing surfaces 81a and 82a is referred to as a third sliding portion 84.

<Third Communication Flow Passage>

An inner annular flow passage 43a through which the sealed fluid flows is formed on the radial outer side of the second sleeve 53 between the third shaft side seal ring 81 and the first shaft side seal ring 71 disposed on the lower side. The inner annular flow passage 43a communicates with the through-holes 62c (second inner flow passage 62) of the second sleeve 53.

The outer annular flow passage 43b through which the sealed fluid flows is formed between the protrusion 231 of the upper flange 23 and the protrusion 221 of the flow passage flange 22 disposed on the lower side thereof. The outer annular flow passage 43b connects the inner annular flow passage 43a on the radial inner side and the second outer flow passage 32 on the radial outer side.

The inner annular flow passage 43a and the outer annular flow passage 43b are hermetically sealed by a sealing function of the third sliding portion 84, a sealing function of the O-ring 79 disposed on the upper side of the third sliding portion 84, a sealing function of the first sliding portion 77, a sealing function of the O-ring 79 disposed on the lower side of the first sliding portion 77, and a sealing function of the O-rings 26 and 56 disposed on the radial outer side of the outer annular flow passage 43b. In this way, the sealed fluid is prevented from leaking to the outside from the inner annular flow passage 43a and the outer annular flow passage 43b.

As described above, the inner annular flow passage 43a and the outer annular flow passage 43b which are sealed are formed between the first sliding portion 77 and the third sliding portion 84 in the mechanical seal device 7 at the uppermost portion. The flow passages 43a and 43b are included in a third communication flow passage 43 connecting the second outer flow passage 32 at the uppermost portion and the second inner flow passage 62 at the uppermost portion. Further, the second outer flow passage 32 at the uppermost portion, the third communication flow passage 43, and the second inner flow passage 62 at the uppermost portion are included in one independent second fluid passage 12 through which the sealed fluid flows.

Note that similarly to the modification (see FIG. 3), the third communication flow passage 43 may be formed in a member in which the third shaft side seal ring 81 and the first shaft side seal ring 71 disposed on the lower side thereof are integrally formed.

<Cooling Flow Passage>

Figure 5:
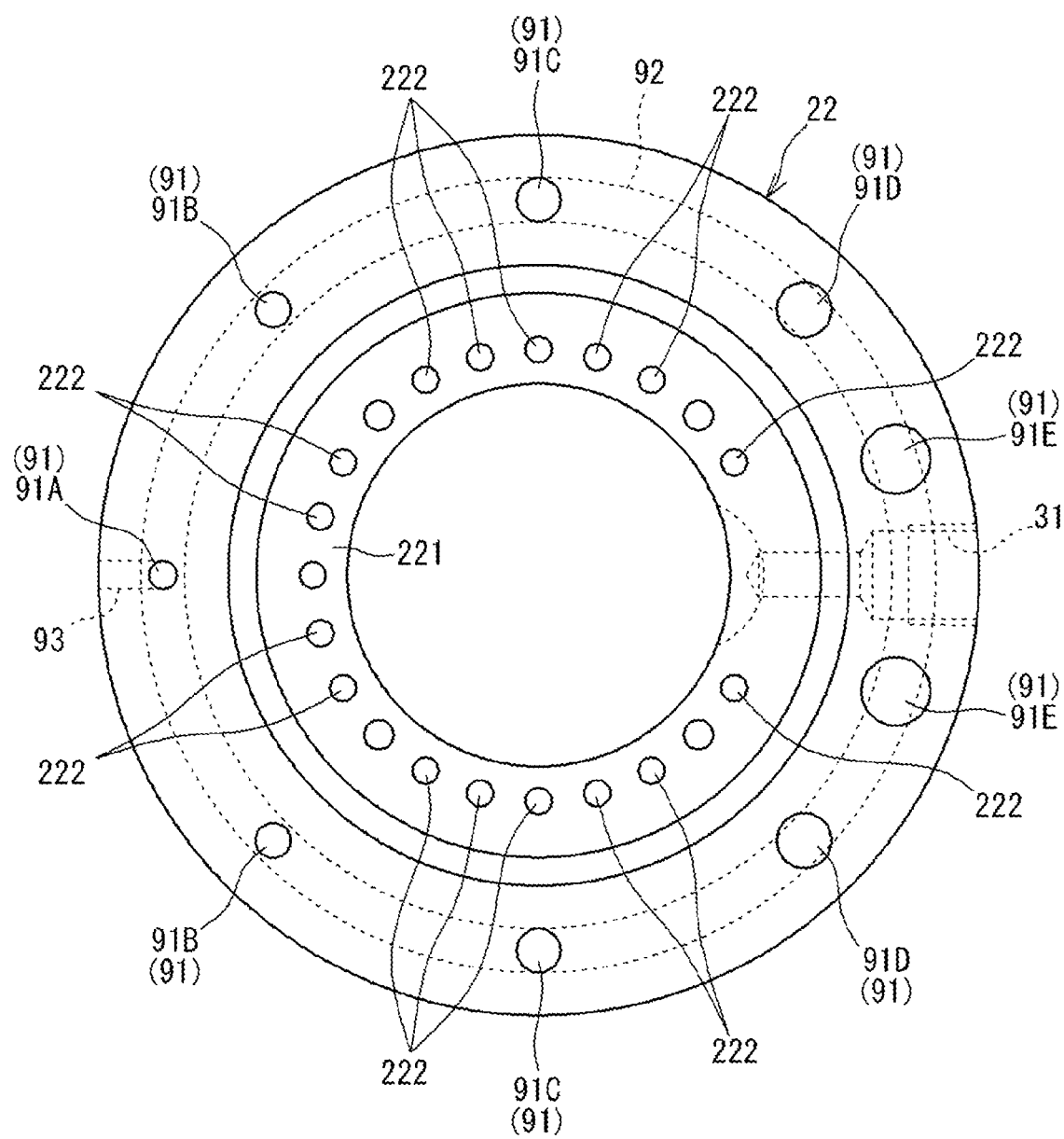
FIG. 5 is a plan view of a flow passage flange disposed at a lowermost portion as viewed from an upper side.

FIG. 5 is a plan view of the flow passage flange 22 disposed at a lowermost portion as viewed from the upper side. In FIG. 1 and FIG. 5, a cooling flow passage 90 through which a cooling fluid flows is formed in the case body 2 independently of the annular space A. As the cooling fluid, a gas such as air or a liquid such as water is used. In the present embodiment, the gas is used as the cooling fluid.

The cooling flow passage 90 includes an axial cooling flow passage 91 extending in the axial direction of the case body 2 (vertical direction) and a circumferential cooling flow passage 92 extending in the circumferential direction of the case body 2.

A plurality of (nine in FIG. 5) axial cooling flow passages 91 is formed at predetermined intervals in the circumferential direction of the case body 2. Each of the axial cooling flow passages 91 is configured by allowing communication between through-holes 911 formed to penetrate the plurality of flow passage flanges 22 in the axial direction at radial outer portions of the flow passage flanges 22.

A plurality of (five in FIG. 1) circumferential cooling flow passages 92 is formed at predetermined intervals in the axial direction of the case body 2. Each of the circumferential cooling flow passages 92 includes an annular groove 921 formed in each of the flow passage flanges 22. In the present embodiment, annular grooves 921 included in the circumferential cooling flow passages 92 are formed on an upper surface and a lower surface of the flow passage flange 22 disposed at the uppermost portion, and the lower surfaces of the remaining flow passage flanges 22.

Each of the annular grooves 921 is formed to intersect all through-holes 911 formed in the corresponding flow passage flange 22. In this way, each of the circumferential cooling flow passages 92 communicates with all axial cooling flow passages 91 (through-holes 911) formed in the corresponding flow passage flange 22. Note that an upper end opening of the annular groove 921 arranged at the uppermost portion is closed by the lower surface of the upper flange 23. Further, a lower end opening of the annular groove 921 arranged at the lowermost portion is closed by the upper surface of the lower flange 21.

The cooling flow passage 90 further includes an inflow passage 93 for supplying the cooling fluid from the outside of the case body 2 to the axial cooling flow passage 91, and an outflow passage 94 for discharging the cooling fluid from the axial cooling flow passage 91 to the outside.

The inflow passage 93 is formed at one location on the outer circumference of the flow passage flange 22 disposed at the lowermost portion, and communicates with one of the plurality of through-holes 911 (axial cooling flow passages 91) formed in the flow passage flange 22.

The outflow passage 94 is formed at one location on the outer circumference of the flow passage flange 22 disposed at the uppermost portion, and communicates with one of the plurality of through-holes 911 formed in the flow passage flange 22.

Note that the O-ring 26 disposed between the cooling flow passage 90 and the annular space A prevents the cooling fluid flowing in the cooling flow passage 90 from leaking into the annular space A, and prevents the sealed fluid in the annular space A (communication flow passages 41 to 43) from leaking into the cooling flow passage 90.

In FIG. 5, the plurality of axial cooling flow passages 91 includes a first axial cooling flow passage 91A to which the cooling fluid is supplied from the inflow passage 93, and a plurality of second axial cooling flow passages 91B, 91C, 91D, and 91E to which the cooling fluid is supplied from the first axial cooling flow passage 91A via the circumferential cooling flow passage 92. For example, two second axial cooling flow passages 91B, two second axial cooling flow passages 91C, two second axial cooling flow passages 91D, and two second axial cooling flow passages 91E are formed.

The first axial cooling flow passage 91A communicates with the inflow passage 93 at the lower end portion and communicates with the outflow passage 94 at the upper end portion (see FIG. 1). A cross-sectional area of the first axial cooling flow passage 91A is formed to be the smallest among the plurality of axial cooling flow passages 91 (91A to 91E). Here, the cross-sectional area refers to an area of a cross section orthogonal to a flow direction of the cooling fluid in the flow passage (hereinafter, this description is similarly applied).

The plurality of second axial cooling flow passages 91B, 91C, 91D, and 91E is formed to be away from the first axial cooling flow passage 91A in this order along the circumferential direction. Further, the respective cross-sectional areas of the plurality of second axial cooling flow passages 91B, 91C, 91D, and 91E are formed so as to gradually increase as the distance from the first axial cooling flow passage 91A increases. That is, the respective cross-sectional areas of the plurality of second axial cooling flow passages 91B, 91C, 91D, and 91E are formed so as to gradually increase in this order.

As described above, in the flow passage flange 22 at the lowermost portion, the cooling fluid supplied from the inflow passage 93 to the first axial cooling flow passage 91A passes through the circumferential cooling flow passage 92, and is supplied to the respective lower end portions of the plurality of second axial cooling flow passages 91B, 91C, 91D, and 91E in this order. In this instance, the cross-sectional area of the first axial cooling flow passage 91A, through which the cooling fluid flows most easily, is formed to be the smallest, and the cross-sectional area gradually increases in the second axial cooling flow passages 91B to 91E away from the first axial cooling flow passage 91A, that is, in the second axial cooling flow passages 91B to 91E through which the cooling fluid hardly flows. Thus, the cooling fluid evenly flows through the plurality of axial cooling flow passages 91.

The cooling fluid supplied to the lower end portion of each of the axial cooling flow passages 91A to 91E flows upward toward the upper end portion of each of the axial cooling flow passages 91A to 91E. In this instance, the cooling fluid cools the first and second sliding portions 77 and 78 via the flow passage flange 22 and the first and second case side seal rings 73 and 74. In addition, the cooling fluid cools the third sliding portion 84 via the upper flange 23 and the third case side seal ring 82. The cooling fluid flowing to the upper end portion of each of the axial cooling flow passages 91A to 91E passes through the circumferential cooling flow passage 92 and the first axial cooling flow passage 91A and is discharged to the outside from the outflow passage 94 in the flow passage flanges 22 at the uppermost portion.

<Effect>

As described above, according to the rotary joint 1 of the present embodiment, the first communication flow passage 41 connecting the first outer flow passage 31 and the first inner flow passage 61 is formed between the first sliding portion 77 and the second sliding portion 78 of each mechanical seal device 7. In addition, in the mechanical seal devices 7 adjacent to each other in the axial direction, the second communication flow passage 42 connecting the second outer flow passage 32 and the second inner flow passage 62 is formed between the first sliding portion 77 of the mechanical seal device 7 on one side in the axial direction and the second sliding portion 78 of the mechanical seal device 7 on the other side in the axial direction. In this way, three communication flow passages (two first communication flow passages 41 and one second communication flow passage 42) can be formed by two mechanical seal devices 7 (corresponding to conventional four mechanical seals). On the other hand, in the conventional rotary joint, six mechanical seals are required to form three communication flow passages. Therefore, according to the rotary joint 1 of the invention, it is possible to suppress an increase in the total length in the axial direction even when the number of communication flow passages (the number of ports) increases, as compared to the conventional rotary joint.

In addition, in the case of increasing one communication flow passage at one end of the rotary joint 1 in the axial direction, one communication flow passage (the third communication flow passage 43) can be increased only by adding two seal rings (the third shaft side seal ring 81 and the third case side seal ring 82) to the mechanical seal device 7 disposed at the one end side. In this way, it is possible to suppress the increase in the total length in the axial direction when compared to the case of adding the mechanical seal device 7 that forms one communication flow passage (the first communication flow passage 41) using four seal rings (the first and second shaft side seal rings 71 and 72 and the first and second case side seal rings 73 and 74).

In addition, by allowing the cooling fluid to flow to the axial cooling flow passage 91 formed in the case body 2 to extend in the axial direction independently of the annular space A, it is possible to cool the sliding portions 77, 78, and 84 between the case side seal rings 73, 74, and 82 and the shaft side seal rings 71, 72, and 81 via the case body 2 and the respective case side seal rings 73, 74, and 82. In this way, it is possible to suppress sliding heat generation at each of the sliding portions 77, 78, and 84. In particular, when the second communication flow passage 42 and the third communication flow passage 43 are formed in the annular space A as in the present embodiment, these communication flow passages 42 and 43 may not be used as the cooling space. However, even in such a case, it is possible to effectively suppress sliding heat generation at the sliding portions 77, 78, and 84 forming the communication flow passages 42 and 43.

Further, the cooling fluid passes through the circumferential cooling flow passage 92 and flows to the plurality of axial cooling flow passages 91, and thus can cool the respective sliding portions 77, 78, and 84 at a plurality of locations in the circumferential direction. In this way, it is possible to further suppress sliding heat generation at the respective sliding portions 77, 78, and 84.

Further, the cross-sectional area of the first axial cooling flow passage 91A, through which the cooling fluid easily flows, is formed to be the smallest among the plurality of axial cooling flow passages 91, and the cross-sectional area gradually increases in the second axial cooling flow passages 91B to 91E through which the cooling fluid hardly flows. In this way, the cooling fluid can be allowed to evenly flow through the plurality of axial cooling flow passages 91, and thus it is possible to further suppress sliding heat generation at the respective sliding portions 77, 78, and 84.

Second Embodiment

Figure 6:
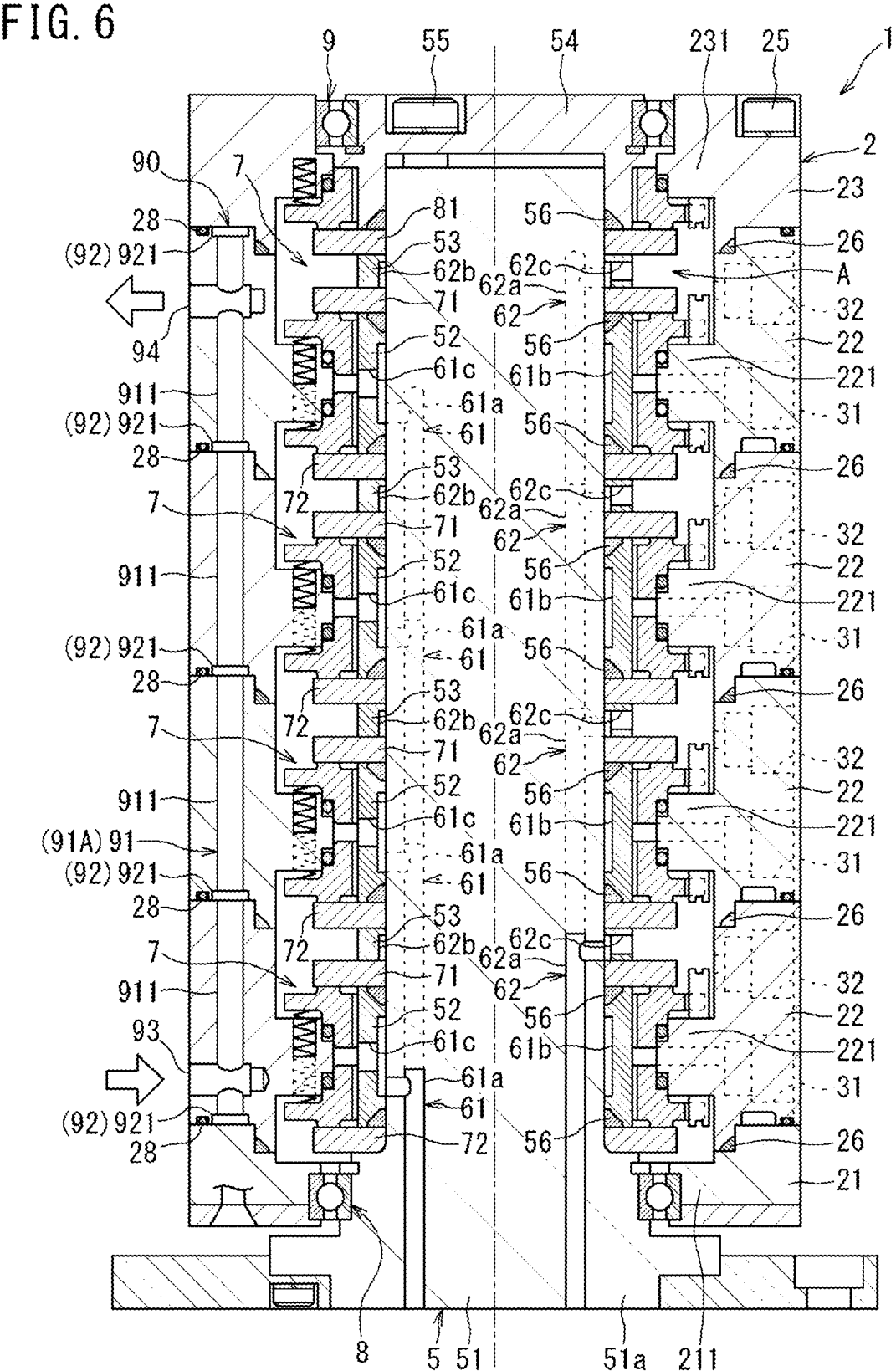
FIG. 6 is a cross-sectional view illustrating a rotary joint according to a second embodiment of the invention.

FIG. 6 is a cross-sectional view illustrating a rotary joint according to a second embodiment of the invention. In a rotary joint 1 of the second embodiment, a liquid is used as the cooling fluid. On the radial outer side of the cooling flow passage 90 of the case body 2, O-rings 28 are provided between the lower flange 21 and the flow passage flange 22 adjacent to each other, between the flow passage flanges 22 adjacent to each other, and between the flow passage flange 22 and the upper flange 23 adjacent to each other, respectively. These O-rings 28 prevent the liquid which is the cooling fluid from leaking to the outside from the cooling flow passage 90. Other configurations of the present embodiment are similar to those of the first embodiment, and thus a description thereof will be omitted.

The rotary joint 1 of the present embodiment has a similar effect to that of the first embodiment.

[Others]

The rotary joint 1 in each of the embodiments may be disposed upside down in the axial direction, or may be disposed so that the axial direction is a horizontal direction. Further, the rotary joint 1 can be applied to other devices such as a sputtering device and an etching device in addition to the CMP device. Further, the rotary joint 1 is not limited to use in a semiconductor field.

In each of the embodiments, the mechanical seal device 7 disposed at the uppermost portion includes the third shaft side seal ring 81 and the third case side seal ring 82. However, in addition to or instead of this configuration, the mechanical seal device 7 disposed at the lowermost portion may include the third shaft side seal ring 81 and the third case side seal ring 82. In this case, the third shaft side seal ring 81 may be attached to the shaft body 5 on the lower side of the second sliding portion 78 of the mechanical seal device 7 disposed at the lowermost portion, that is, on the lower side of the second shaft side seal ring 72, and the third case side seal ring 82 may be attached to the case body 2 adjacent to the lower side of the third shaft side seal ring 81.

Further, each of the mechanical seal devices 7 disposed at the uppermost portion and the lowermost portion may not include the third shaft side seal ring 81 and the third case side seal ring 82.

In each of the embodiments, the case body 2 is attached to the fixed side member, and the shaft body 5 is attached to the rotating side member. However, the case body 2 may be attached to the rotating side member, and the shaft body 5 may be attached to the fixed side member.

The embodiments disclosed this time should be considered to be exemplary and not restrictive in all respects. The scope of the invention is indicated by the claims rather than the above meaning, and is intended to include meanings equivalent to the claims and all modifications within the scope.

REFERENCE SIGNS LIST 1 rotary joint
2 case body
5 shaft body
7 mechanical seal device
31 first outer flow passage (outer flow passage)
32 second outer flow passage (outer flow passage)
41 first communication flow passage
42 second communication flow passage
43 third communication flow passage
71 first shaft side seal ring
72 second shaft side seal ring
73 first case side seal ring
74 second case side seal ring
77 first sliding portion
78 second sliding portion
81 third shaft side seal ring
82 third case side seal ring
84 third sliding portion
91 axial cooling flow passage
91A first axial cooling flow passage
91B to 91E second axial cooling flow passage
92 circumferential cooling flow passage
A annular space

The invention claimed is:

1. A rotary joint comprising:
a tubular case body in which a plurality of outer flow passages is formed by openings on an inner circumferential side, a sealed fluid flowing through the outer flow passages;
a shaft body relatively rotatably provided in the case body, a plurality of inner flow passages through which a sealed fluid flows being formed therein by openings on an outer circumferential side; and
a plurality of mechanical seal devices disposed side by side in an axial direction in an annular space formed between the case body and the shaft body,
wherein each of the mechanical seal devices includes
a first shaft side seal ring attached to the shaft body,
a first case side seal ring attached adjacent to one side of the first shaft side seal ring in the axial direction in the case body to slide relative to the first shaft side seal ring,
a second case side seal ring attached to one side in the axial direction with respect to the first case side seal ring in the case body, and
a second shaft side seal ring attached adjacent to one side of the second case side seal ring in the axial direction in the shaft body to slide relative to the second case side seal ring,
a first communication flow passage that partitions the annular space and connects one of the outer flow passages and one of the inner flow passages is formed between a first sliding portion of the first shaft side seal ring and the first case side seal ring and a second sliding portion of the second shaft side seal ring and the second case side seal ring in each of the mechanical seal devices, and
a second communication flow passage that partitions the annular space and connects another one of the outer flow passages and another one of the inner flow passages is formed between the first sliding portion of a mechanical seal device disposed on one side in the axial direction and the second sliding portion of a mechanical seal device disposed on the other side in the axial direction in mechanical seal devices adjacent to each other in the axial direction,
wherein the case body has an axial cooling flow passage, through which a cooling fluid flows, formed to extend in the axial direction independently of the annular space.

2. The rotary joint according to claim 1,
wherein one of the plurality of mechanical seal devices disposed at one end in the axial direction further includes
a third shaft side seal ring attached to the shaft body on a side of the one end of one of the first sliding portion and the second sliding portion disposed on the one end side, and
a third case side seal ring attached to the case body adjacent to the one end side of the third shaft side seal ring to slide relative to the third shaft side seal ring, and
a third communication flow passage that partitions the annular space and connects still another one of the outer flow passages and still another one of the inner flow passages is formed between the one sliding portion and a third sliding portion of the third shaft side seal ring and the third case side seal ring.

3. The rotary joint according to claim 1,
wherein the case body has
a plurality of axial cooling flow passages formed in a circumferential direction thereof, and
a circumferential cooling flow passage that is formed to extend in the circumferential direction independently of the annular space and communicates with the plurality of axial cooling flow passages.

4. The rotary joint according to claim 3,
wherein the plurality of axial cooling flow passages includes a first axial cooling flow passage to which the cooling fluid is supplied from an outside of the case body, and two or more second axial cooling flow passages to which the cooling fluid is supplied from the first axial cooling flow passage via the circumferential cooling flow passage,
a cross-sectional area of the first axial cooling flow passage is formed to be smallest among the plurality of axial cooling flow passages, and
respective cross-sectional areas of the two or more second axial cooling flow passages are formed to gradually increase as a distance from the first axial cooling flow passage increases.

\* \* \* \* \*